United States Patent
Nielsen

(12) 
(10) Patent No.: US 6,665,601 B1
(45) Date of Patent: Dec. 16, 2003

(54) COMMUNICATIONS SYSTEM FOR MANAGING MESSAGES ACROSS A VEHICLE DATA BUS

(75) Inventor: Brad Nielsen, Lisle, IL (US)

(73) Assignee: Case Corporation, Racine, WI (US)

(*) Notice: Subject to any disclaimer, the term of this patent is extended or adjusted under 35 U.S.C. 154(b) by 0 days.

(21) Appl. No.: 09/218,689

(22) Filed: Dec. 22, 1998

(51) Int. Cl.⁷ .............................. G06F 7/00; G06F 19/00
(52) U.S. Cl. ..................... 701/50; 710/100; 710/305; 710/60; 710/6
(58) Field of Search .......................... 701/50, 48, 70, 701/1; 710/52, 100, 305, 58–60, 1–8, 107, 117; 477/43, 78; 180/53.1

(56) References Cited

U.S. PATENT DOCUMENTS

| | | | |
|---|---|---|---|
| 4,481,572 A | 11/1984 | Ochsner | 370/85 |
| 4,570,257 A | 2/1986 | Olson et al. | 340/85 |
| 4,719,361 A * | 1/1988 | Brubaker | 290/45 |
| 4,736,367 A | 4/1988 | Wroblewski et al. | 307/10 R |
| 4,760,275 A | 7/1988 | Sato et al. | 340/52 F |
| 4,804,937 A | 2/1989 | Barbiaux et al. | 370/85.1 |
| 4,899,338 A | 2/1990 | Wroblewski | 370/85.7 |
| 4,907,222 A | 3/1990 | Slavik | 375/107 |
| 5,090,029 A | 2/1992 | Yamamoto et al. | 701/50 |
| 5,189,617 A | 2/1993 | Shiraishi | 340/438 |
| 5,200,745 A | 4/1993 | Takai et al. | 370/85.6 |
| 5,325,082 A | 6/1994 | Rodriguez | 340/825.06 |
| 5,343,472 A | 8/1994 | Michihira et al. | 701/50 |
| 5,365,436 A | 11/1994 | Schaller et al. | 340/825.06 |
| 5,401,115 A * | 3/1995 | Musil et al. | 404/72 |
| 5,408,227 A | 4/1995 | Hirabayashi et al. | 701/50 |
| 5,418,526 A | 5/1995 | Crawford | 340/438 |
| 5,467,272 A | 11/1995 | Yoshida et al. | 395/287 |
| 5,525,959 A | 6/1996 | Przybyla et al. | 180/197 |
| 5,526,261 A * | 6/1996 | Kallis et al. | 701/51 |
| 5,558,178 A | 9/1996 | Hess et al. | 395/293 |
| 5,588,123 A | 12/1996 | Loibl | 187/247 |
| 5,630,077 A | 5/1997 | Krein et al. | 340/825.65 |
| 5,897,600 A * | 4/1999 | Elmore et al. | 701/50 |
| 6,111,888 A * | 8/2000 | Green et al. | 370/461 |
| 6,144,910 A * | 11/2000 | Scarlett et al. | 701/50 |
| 6,230,089 B1 * | 5/2001 | Lonn et al. | 701/48 |

* cited by examiner

Primary Examiner—Thomas G. Black
Assistant Examiner—Ronnie Mancho
(74) Attorney, Agent, or Firm—John William Stader; Rebecca L. Henkel

(57) ABSTRACT

A communications system for a work vehicle is shown for managing communications between control units which control various functions of the vehicle. The system includes a data bus supported by the vehicle for communicating messages between control units on the bus. Each control unit has a processor for controlling bi-directional communications with the other control units, including the transmission of first messages onto the data bus and reception of second messages from the bus. The processor of each control unit schedules the transmission of only a predefined number of the first messages on the bus during a predefined time period. This number of first messages is selected to insure that each control unit is able to transmit its scheduled messages within the time period. The processor of each control unit efficiently sorts the second messages in reference to a plurality of lookup tables to distinguish between undesired messages and a set of desired messages, and to save each of the desired messages in a memory location defined to store the respective message. When the same message is received from multiple control units, the same messages are stored in a shared memory location, where the stored message can be overwritten by a more recently received same message, or in unique memory locations so that the particular same messages received from different control units can be distinguished.

24 Claims, 5 Drawing Sheets

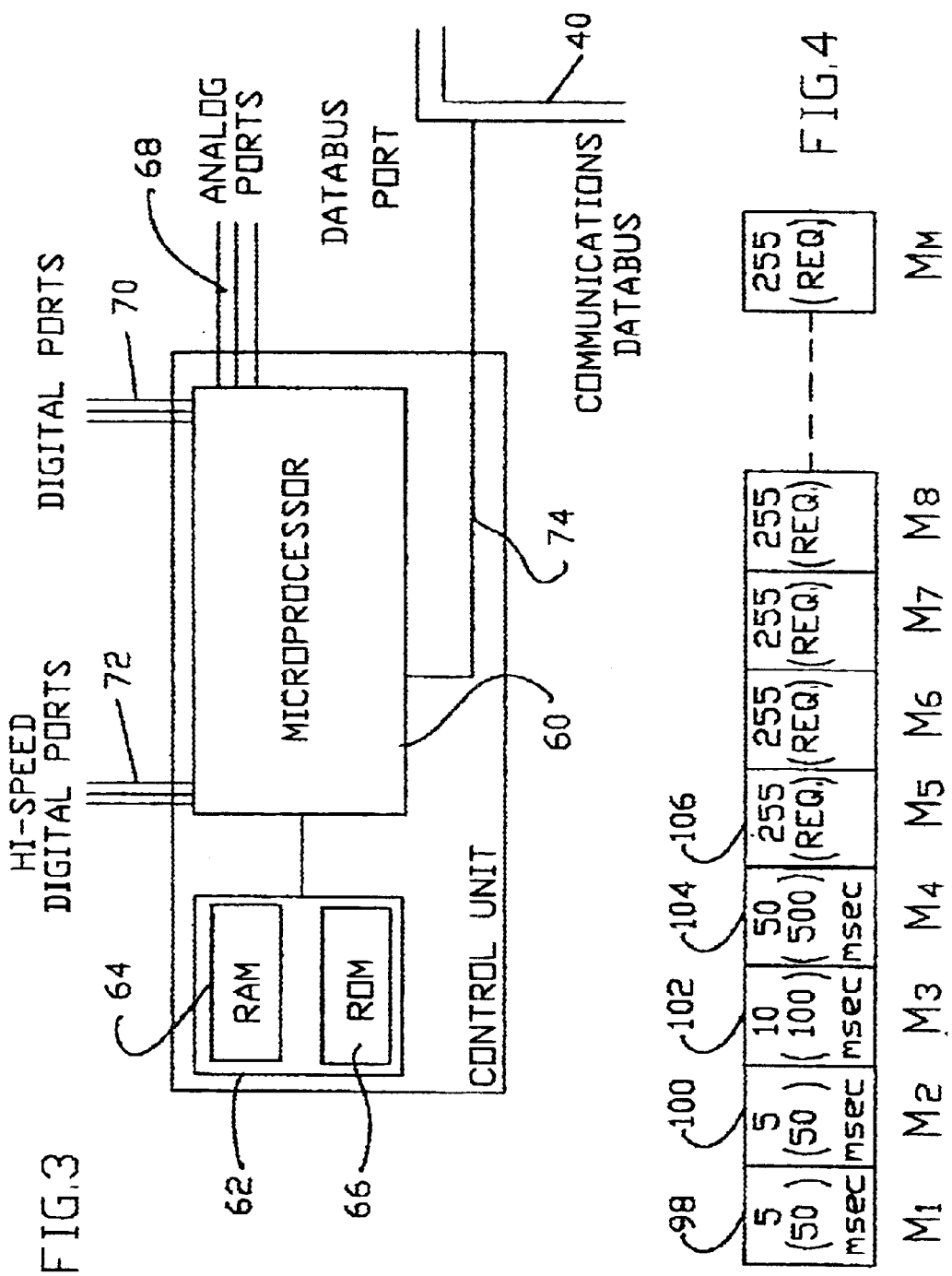

COMMUNICATIONS SYSTEM FOR MANAGING MESSAGES ACROSS A VEHICLE DATA BUS

FIELD OF THE INVENTION

The present invention relates generally to a communication system in a work vehicle for managing communications between control units that control various functions of the vehicle. More particularly, the invention relates to controlling the transmission and reception of messages between the control units on a work vehicle over a data bus wherein only a predefined number of messages are scheduled for transmission during a predefined time period and wherein received messages are sorted using lookup tables into a set of desired messages for storage.

BACKGROUND OF THE INVENTION

Work vehicles including, but not limited to, agricultural work vehicles (e.g., tractors and combines) and construction work vehicles (e.g., dozers and loader-backhoes), perform certain functions based on the interaction of several control units which communicate with each other over a data bus. Each control unit may perform certain functions in conjunction with a particular device coupled to the control unit. For example, a transmission control unit connected to a work vehicle's transmission can direct the transmission to downshift, upshift or maintain a constant gear ratio based upon inputs received from a gear shift lever operated by the vehicle operator, and also based upon data received from other control units via the data bus. The transmission control unit may also receive feedback signals from the transmission. Further, the transmission control unit may itself transmit data (e.g., status and fault data for the transmission) over the bus to other control units. Thus, the transmission control unit may be capable of both transmitting and receiving data via the data bus.

In a typical work vehicle having a data bus populated by multiple control units (e.g., an armrest control unit, the transmission control unit, etc.), each control unit may be required to transmit and receive messages over the same data bus. For example, to properly execute its respective control functions, each control unit on the bus may need to receive certain sensed or calculated input data from other control units at predefined update rates, and may also be required to transmit certain output data for use by the other control units, also at predefined update rates. Further, upon detection of certain events or conditions (e.g., upon detection of a malfunction such as a transmission fault or upon detection of a change in status such as the actuation of an operator input device), the control units may be required to provide a "flag" signal on the bus indicative of the event or condition for use by the other control units. Some of the "flag" signals, such as those indicating a change in an important system input or fault, may need to be transmitted over the bus to the other control units immediately.

As work vehicles become increasingly sophisticated, additional control units continue to be coupled to the data bus and incorporated into the communications system. With each additional control unit, the scheduling of messages on the data bus becomes more complex. In some cases, all of the messages cannot be transmitted as quickly as desired under all conditions without exceeding the bandwidth of the bus. For example, the operator of a work vehicle expects the vehicle to respond quickly to actuations of an operator input device (e.g., actuation of a four-wheel drive switch). Thus, when the input device is actuated, the change in status must be transmitted to the appropriate control unit relatively quickly to avoid a sluggish response. However, in some communications systems, the status of infrequently changing inputs such as operator input devices are transmitted at relatively slow periodic update rates (e.g., every 500 msec), such that the response time to a change in status is correspondingly slow. In other communications systems, the status of infrequently changing inputs such as switches is transmitted only when a transition is detected, and there is no scheduled periodic update. While not performing periodic updates of these inputs decreases loading on the bus and increases the bus bandwidth available for other signals, the communications system may miss signals due to failures or transients, thereby causing a loss of system functionality. In existing vehicle communications systems, thus, the system designer must often select an appropriate balance between vehicle responsiveness, bus loading, and the ability to gracefully handle transients.

Accordingly, it would be advantageous to have a communications system for a work vehicle that provides the ability to schedule a relatively slow update transmission rate for signals that do not normally require fast update rates, while also providing the ability to transmit these signals quickly upon a change in status or upon the occurrence of an event or condition. The slow update rates normally used would allow the system to confirm that the status of a signal has not changed since the last update (e.g., that the position of an operator input switch has not changed), while the expedited update rate would allow a change in status or occurrence of an event to be communicated quickly, thereby improving the responsiveness of the system. Thus, it would be advantageous to have a communications system including an "expediting" function which transmits the values of signals that change infrequently at relatively slow periodic update rates to allow status checking and to reduce the data bus usage associated with fast update rates, and transmits the values quickly upon a change in status or occurrence of a condition or event. It would also be advantageous if the system included a "request only" function to transmit the values of certain signals only when the transmission is requested by another control unit on the data bus.

The communications system on vehicles must also insure that each control unit on the data bus can transmit its scheduled messages on the bus within a maximum delay time to avoid the use of stale data by the receiving control units. For example, a particular control unit may have messages that must be transmitted every 50, 100 or 500 msec. As the number of control units on the bus increases, however, it can become increasingly difficult for each control unit to meet its transmission update rate requirements. For example, the communications systems on some work vehicles include a data bus according to the Controller Area Network (CAN) protocol. The CAN protocol includes a message arbitration scheme to resolve conflicts which may occur when competing control units attempt to transmit messages on the CAN bus at the same time. The message arbitration scheme uses a 29-bit Arbitration Field in the ID portion of the message to specify the priority of that message. The message with a numerically lower Arbitration Field has a higher priority than a message with a higher Arbitration Field, and will win the arbitration. This arbitration scheme can cause problems in real-time control systems such as those used in work vehicles since it is difficult to guarantee a maximum time delay for any message other than the highest-priority message, and the problem worsens with increased bus loading. Accordingly, it would be advantageous to provide a communications system for a work vehicle including a CAN data bus populated by multiple control units wherein the maximum latency (i.e., delay time) for all messages transmitted over the CAN bus is guaranteed.

In addition to transmitting messages over the data bus to other control units, communications systems on work vehicles also need to manage the reception of messages transmitted over the data bus by other control units. Due to the high traffic on the data bus, each control unit of the communications system must be capable of quickly sorting all the incoming messages and of storing only the messages in which the control unit is interested (i.e., each control unit needs to listen to only a portion of the received messages). Incoming messages may be checked against a list maintained by each control unit which identifies those messages that the respective control unit wants to receive. This checking process, however, is relatively slow and inflexible given the high volume of desired and undesired messages being communicated on the bus. In some situations, other requirements make the checking process even slower. For example, if a control unit receives the same message from several of the other control units and needs to save each of these messages based on which control unit sent the message, the checking process becomes even more cumbersome since the list now needs to include additional data related to the source of the incoming messages. The increased complexity associated with providing the flexibility to sort and store each message separately based on which control unit transmitted the message may render the communications system unacceptably slow, and possibly even inoperable. Further, the increased memory required to store the same message received from several other control units in separate memory locations based upon which control unit sent the message may not always be available.

Accordingly, it would be advantageous to develop a communications system for a work vehicle wherein each control unit can quickly and efficiently sort incoming data bus messages while providing the versatility of being able to store identical messages received from different control units in either the same memory location or in separate memory locations associated with the sending control units.

SUMMARY OF THE INVENTION

The present invention relates to a communications system for a work vehicle. The communications system includes a data bus supported by the work vehicle for communicating messages along with multiple control units coupled to the data bus. Each control unit controls a function of the work vehicle and includes a processor for controlling communications with at least one other control unit on the data bus. The communications include transmitting first messages onto the data bus and receiving second messages from the data bus. The processor of each control unit schedules the transmission of only a predefined number of the first messages on the bus during a predefined time period. The predefined number is selected so that each control unit can transmit its scheduled messages within the predefined time period.

The present invention further relates to a communications system for a work vehicle. The communications system includes a data bus supported by the work vehicle for communicating messages and multiple control units coupled to the bus. Each control unit controls a function of the work vehicle, and includes a processor for controlling communications with at least one other control unit on the data bus. The communications include transmission of first messages onto the bus and reception of second messages from the bus. The second messages include undesired messages and a set of desired messages. The processor of each control unit also sorts the second messages in reference to a plurality of lookup tables to distinguish between the undesired messages and the set of desired messages, and saves each of the desired messages in a memory location defined to store the respective message.

The present invention further relates to a communications system for a work vehicle. The communications system includes a data bus supported by the work vehicle for communicating messages and multiple control units coupled to the bus. Each control unit controls a function of the work vehicle, and includes a processor for controlling communications with at least one other control unit on the data bus. The communications include transmission of first messages onto the bus and reception of second messages from the bus. The second messages include undesired messages and a set of desired messages. The processor of each control unit schedules the transmission of only a predefined number of the first messages on the data bus during a predefined time period. The predefined number is selected such that each control unit can transmit its scheduled messages within the predefined time period. The processor of each control unit also sorts the second messages in reference to a plurality of lookup tables to distinguish between the undesired messages and the set of desired messages, and saves each of the desired messages in a memory location defined to store the respective message.

BRIEF DESCRIPTION OF THE DRAWINGS

The present invention will become more fully understood from the following detailed description, taken in conjunction with the accompanying drawings, wherein like reference numerals refer to like parts, in which:

FIG. 3 is a block diagram illustrating an exemplary control unit;

FIG. 4 is a diagrammatical view illustrating exemplary update rates assigned to data bus messages, as stored in the memory of the control unit in FIG. 3;

DETAILED DESCRIPTION OF THE PREFERRED EMBODIMENTS

Figure 1:
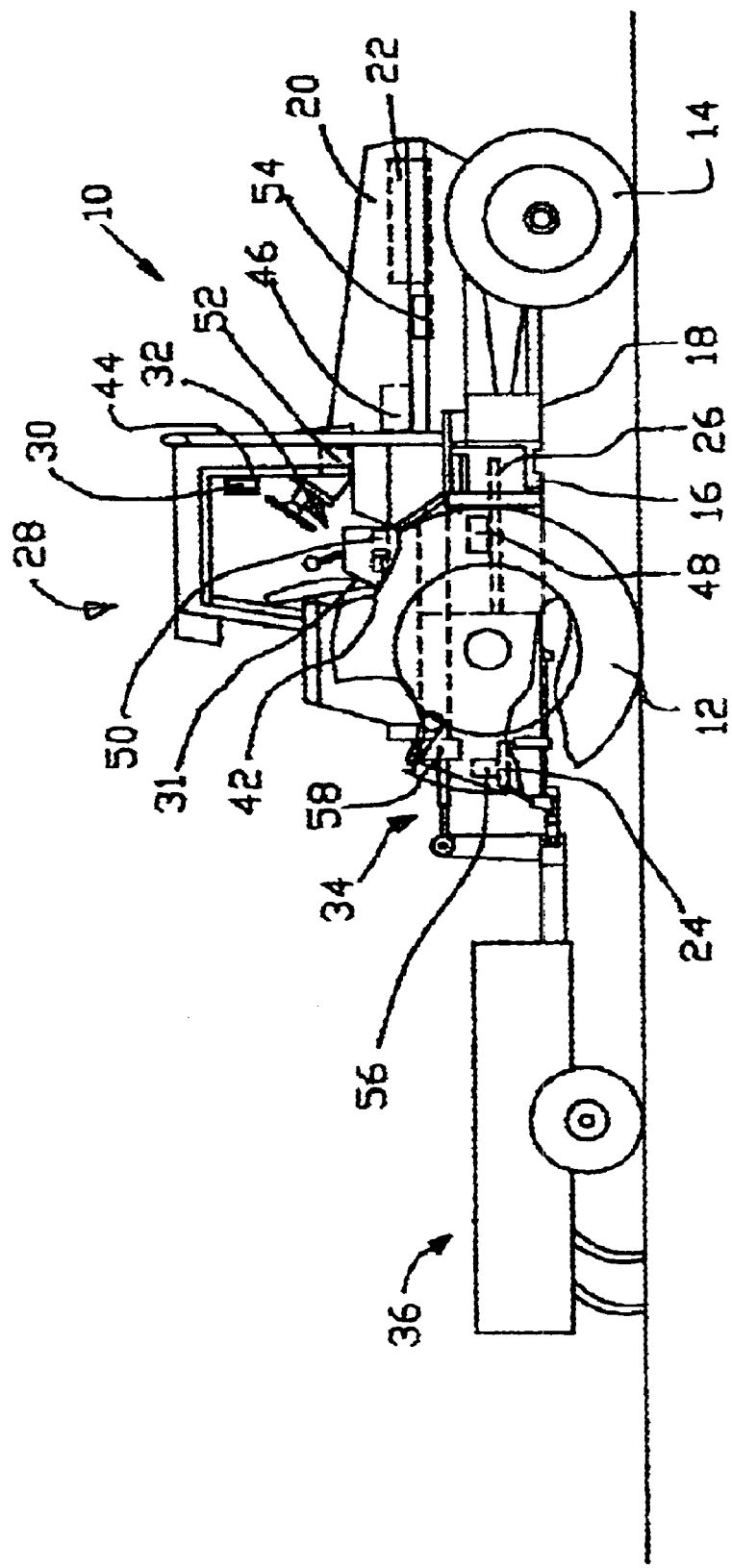
FIG. 1 is a side elevational view of a work vehicle (e.g., a tractor towing an implement) equipped with a data bus populated by control units.

Referring to FIG. 1, a tractor, designated generally by the reference numeral 10, is illustrated as representative of agricultural work vehicles such as the Case Corporation MX Series MAGNUM tractor. Alternatively, tractor 10 may be another type of work vehicle such as an agricultural harvesting vehicle (e.g., a combine) or a construction vehicle (e.g., a dozer or a loader-backhoe). Tractor 10 has rear wheels 12, front wheels 14, a tractor frame 16 and a chassis 18. Tractor 10 also has an engine compartment 20 containing an engine or power plant 22 that powers wheels 12 and/or 14 via drive train elements such as a transmission 26. Engine 22 may also provide power, via transmission 26, to a power-take-off ("PTO") shaft 24 and a hydraulic system (not shown). Tractor 10 further has an operator cab 28 which is provided with a variety of instruments and controls. Among these instruments and controls is an operator interface shown as a touch-sensitive video monitor or "touch screen" 30 capable of obtaining input signals from the operator and displaying visual information to the operator. Other operator input devices including switches, levers and knobs are mounted within cab 28 on an armrest control console 31. Cab 28 also includes an auxiliary hydraulic controller 32 for controlling the operation of the hydraulic system.

Tractor 10 includes a three-point hitch 34 which can be coupled to an implement, such as a ripper 36 (such as a Case Corporation 6810 Ripper). Tractor 10 can also tow a variety of other implements used to perform one or more functions upon an agricultural field including, but not limited to, planters, sprayers, air drills, conventional drills, disk harrows and chisel plows, such as the Case Corporation 955 Early Riser Cycle Air planter, 3000 TS Sprayer, 3503 Air Drill, 5500 Conventional Drill, 3950 Tandem Disk Harrow and 5800 Mulch-Till Chisel Plow, respectively.

Figure 2:
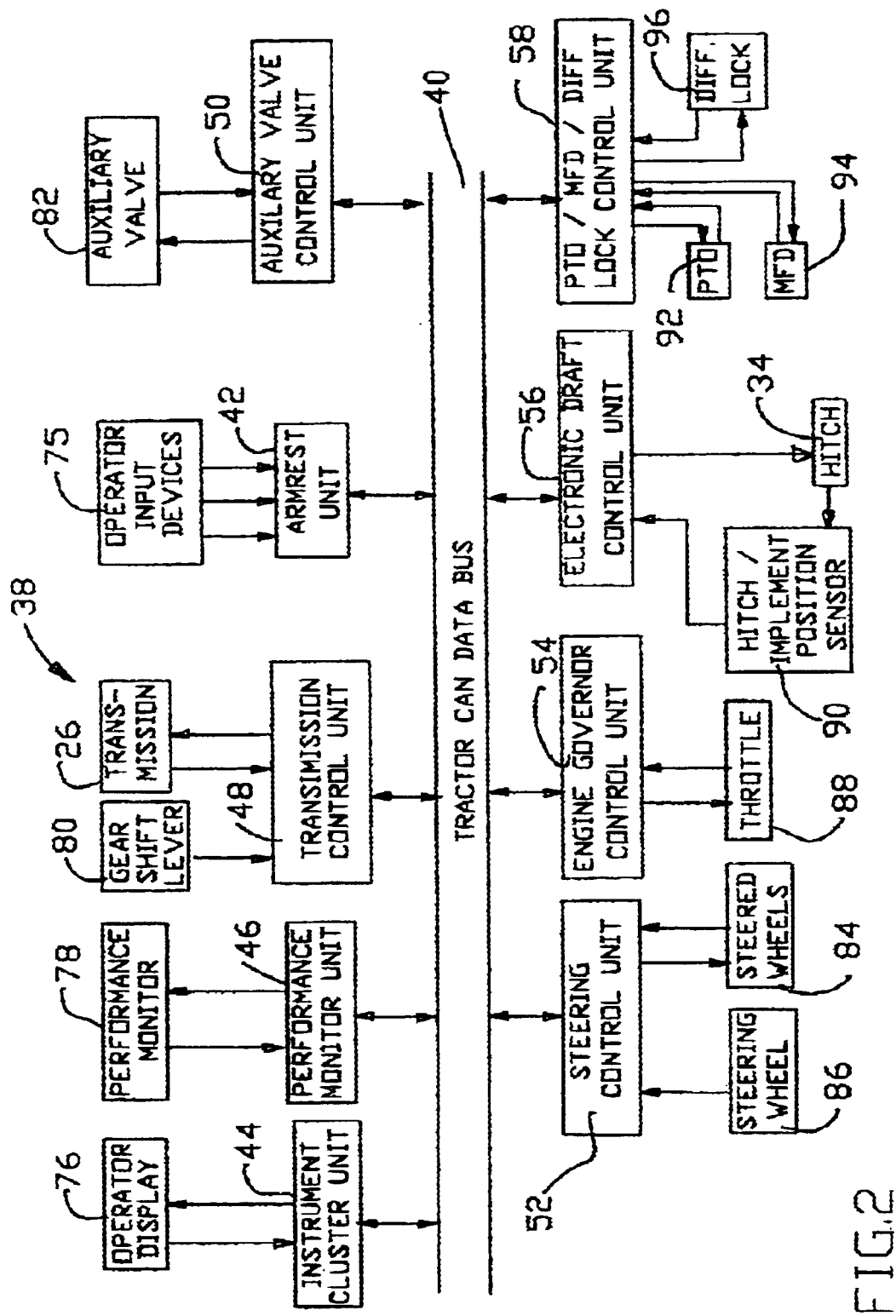
FIG. 2 is a block diagram illustrating exemplary control units coupled to a data bus and to devices corresponding to the function each control unit performs.

In FIGS. 1–2, tractor 10 supports an electronic control system 38 including a data bus 40 for communicating data between elements of system 38. In one embodiment, data bus 40 is a Controller Area Network (CAN) bus conforming to the SAE J-1939 "Recommended Practice for a Serial Control and Communications Vehicle Network". Among the elements connected to data bus 40 are nine electronic control units ("ECUs") including an armrest unit ("ARU") 42, an instrument cluster unit ("ICU") 44, a performance monitor unit ("PMU") 46, a transmission control unit ("TCU") 48, an auxiliary valve control unit ("AVCU") 50, a steering control unit ("STCU") 52, an engine governor control unit ("GOV") 54, an electronic draft control unit ("EDCU") 56, and a power take-off/mechanical front-wheel drive/differential lock control unit ("PTO") 58. Each ECU 42–58 controls one or more specific functions for tractor 10 using particular input and output devices, as explained below.

Alternatively, in other work vehicle applications, there may be more or fewer ECUs which perform the same or different functions using the sane or different input and output devices. In addition, the data bus may implement another data bus protocol. Further, while ECUs 42–58 are coupled to a vehicle data bus 40 in FIG. 2, the work vehicle may also support an implement data bus coupled to implement ECUs (e.g., planting monitors, variable-rate controllers), wherein the vehicle data bus and the implement data bus may or may not be coupled together via a bridge circuit.

Each ECU on the implement bus would also communicate as described below.

Referring to FIG. 3, each ECU 42–58 may have in common particular internal components including a processing device such as a microprocessor or microcontroller 60 and a memory circuit 62. Memory circuit 62 includes a random access memory ("RAM") 64 and a read-only memory ("ROM") 66. In the preferred embodiment, RAM 64 includes arrays of byte values wherein each byte represents a timer for a different message transmitted and received over data bus 40, and ROM 66 includes arrays of byte values wherein each byte represents a preset update rate for a different message to be transmitted over data bus 40. The preset update rates can also be stored in RAM 64 to allow the rates to be modified for increased flexibility, with the RAM values initialized from ROM 66 or from code executed by microprocessor 60. In one embodiment, ECUs 42–58 are programmable such that control programs and data in the form of configuration and lookup tables are stored in memory circuit 62. The control programs and tables are used by the ECUs to determine various parameters, such as timing delays. In the following, microprocessor 60 is described as controlling or managing communication of messages with the other ECUs on data bus 40. Thus, microprocessor 60 can be considered to be a communications processor. It is to be understood, however, that microprocessor 60 may also provide other control functions for the particular control unit, such as reading input devices, executing control algorithms, and controlling output devices. Alternatively, each ECU may include one processor for controlling ECU functions and a second processor dedicated to controlling communications.

Each ECU 42–58 may also include one or more analog input/output ports 68, standard digital input/output ports 70, and high-speed digital ports 72 for receiving and transmitting information. Furthermore, microprocessor 60 may include one or more data bus ports 74 coupled to data bus 40. Alternatively, ECUs 42–58 may differ in structure and could include, for example, dedicated, hardwired logic circuits.

Referring again to FIG. 2, electronic control system 38 includes ARU 42, ICU 44, PMU 46, TCU 48, AVCU 50, STCU 52, GOV 54, EDCU 56 and PTO 58 coupled to communications data bus 40. Alternatively, electronic control system 38 could include additional or modified elements, or exclude some of the elements in FIG. 2. In particular, modifications would result from the implementation of electronic control system 38 in other agricultural or other work vehicles, or from implementation of an electronic control system for the ECUs on an implement bus.

Each ECU is connected to specific output devices and is capable of performing specific vehicle functions in conjunction with its respective output devices (except for ARU 42, which is connected to operator input devices 75 on armrest control console 31). Certain of the control units and their respective output devices are directed primarily to interfacing with the operator of tractor 10. Specifically, ICU 44 is connected to an operator display 76, which may be touch screen 30 (FIG. 1) or a display mounted on a support column of cab 28 or on another status display. ICU 44 is capable of receiving data from bus 40 and of displaying a variety of information, including data concerning the operational status of elements of electronic control system 38 and other characteristics of tractor 10 monitored by system 38, such as vehicle speed or whether tractor 10 has mechanical four-wheel drive engaged. In tractor 10, such information could also include data regarding hitch or implement position or whether tractor 10 has the PTO shaft engaged. Further, display 76 may be capable of providing touch-screen input signals to ICU 44. ICU 44 can process these input signals and communicate data onto bus 40 which is representative thereof. Similar to ICU 44 and display 76 are PMU 46 and a performance monitor interface device 78, respectively. Interface device 78 can display a variety of information to the vehicle operator from data bus 40 as directed by PMU 46, and can also provide operator input signals to PMU 46 for transmission to other ECUs via data bus 40.

The ECUs other than ARU 42, ICU 44 and PMU 46 are directed primarily to controlling operation of one or more mechanical elements of tractor 10. TCU 48 is coupled to transmission 26. Based upon command input signals received from a gear shift lever 80 operated by the vehicle operator, and upon data received from the other ECUs via data bus 40, TCU 48 directs transmission 26 to downshift, upshift or maintain a constant gear ratio. TCU 48 may receive feedback signals from transmission 26, and may output status and fault data to the other ECUs via bus 40. Thus, TCU 48 directs the operation of transmission 26 in response to these signals.

AVCU 50 is coupled to one or more auxiliary valves 82. Based upon commands received from data bus 40, AVCU 50 directs valves 82 to open or close, thereby providing or stopping the flow of pressurized hydraulic fluid through valves 82. Multiple elements on tractor 10, and elements on a hitch or implement attached to tractor 10, such as lift cylinders or markers, may be actuated by hydraulic pressure under the control of such valves. AVCU 50 may also receive feedback signals from auxiliary valves 82, and may output status and fault data to the other ECUs via bus 40.

Similarly, STCU 52 is connected to steered wheels 84 of tractor 10 (e.g., front wheels 14) via a steering actuator or cylinder (not shown). Based upon commands received from steering wheel 86, and upon data received from other ECUs via data bus 40, STCU 52 steers steered wheels 84. Such steering may take place when tractor 10 is driving along a preprogrammed route, involving repetitive steering operations, or may depend upon sensed steering signals. STCU 52 may also receive feedback signals representative of the actual steering angle of steered wheels 84, and may output status and fault data to the other ECUs via bus 40.

GOV 54 is connected to a throttle 88. Based upon commands received from bus 40, GOV 54 controls the opening and closing of throttle 88 so that more or less fuel, respectively, is fed to engine 22. GOV 54 may also receive feedback signals from throttle 88, and may output status and fault data to the other ECUs via bus 40.

EDCU 56 is coupled to actuators for three-point hitch 34 and controls the positioning of hitch 34 (and ripper 36 attached thereto) based upon commands received from data bus 40. The force for positioning these elements may be provided by the hydraulic system (not shown). EDCU 56 may control the positioning of these elements by controlling hydraulic valves. In addition to commands from data bus 40, EDCU 56 may also respond to feedback signals from a hitch/implement position sensor 90 (e.g., a potentiometer) which monitors the status/position of hitch 34, and may output status and fault data to the other ECUs via bus 40.

PTO 58 is coupled to and controls three sets of controllable elements as follows. PTO 58 is connected to power take-off (PTO) system 92 and controls engagement or disengagement of the PTO shaft (e.g., whether the shaft rotates and, if so, the rotation speed) based upon command signals received from data bus 40 as well as feedback signals from PTO system 92. PTO 58 is also connected to MFD system 94 and controls engagement or disengagement of the MFD (e.g., controls whether tractor 10 runs with four-wheel or two-wheel drive) based upon commands received from data bus 40 as well as feedback signals from MFD system 94. Finally, PTO 58 is connected to a DL system 96 and controls engagement or disengagement of the DL (e.g., controls whether the differential gear between the drive wheels on an axle of tractor 10 is locked so that those drive wheels turn at the same angular velocity) based upon commands received from data bus 40 as well as feedback signals received from DL system 96. Whether the MFD or DL are engaged typically depends upon whether hydraulically-actuated clutches associated with each are engaged. Consequently, PTO 58 may control the MFD or DL by controlling hydraulic valves. PTO 58 may also output status and fault data to the other ECUs via bus 40.

Although control system 38 shown in FIG. 2 includes nine ECUs, the communications system disclosed herein may be used in control systems having more or fewer than nine ECUs, and the particular types of ECUs may be the same as or different from those shown in FIG. 2.

Thus, each ECU 42–58 is capable of transmitting signals in the form of messages on data bus 40 for reception by one or more of the other control units. The messages comprise a variety of information including command values (e.g., ARU 42 transmits command values representative of the state of the input devices 75), sensed values (e.g., each ECU may transmit the value of each parameter sensed by a local sensor coupled to that ECU), along with status and fault data as discussed above.

Most of the transmitted messages have a required periodic update rate associated therewith, as determined by the system designer based on the requirements of the particular control system. For example, in the present system, most messages have a periodic update rate of 50, 100 or 500 msec. Other messages have required periodic update rates associated therewith, but may also be transmitted by a particular control unit on an expedited basis, as described below. Still other messages are not transmitted periodically, but are transmitted only upon request of another ECU, or only upon the occurrence of a condition or event, as described below. When determining the required update rate for each message, and whether the message can be transmitted on an expedited or a request-only basis, the system designer analyzes the timing requirements for each message including the maximum acceptable latency for the respective message, and also analyzes the bus loading to insure that the bus bandwidth will not be exceeded.

The communication of all messages on data bus 40, including the transmission of normal, expedited and request-only messages, and the reception of messages from bus 40, is coordinated by the microprocessor 60 in each ECU 42–58. The microprocessor 60 in each ECU 42–58 coordinates the transmission of each message, including normal, expedited and request-only messages, using the message scheduling process described in relation to FIGS. 4–6. Each microprocessor 60 also coordinates the reception of messages, including sorting and saving each desired message to a shared or unique memory location, as described in relation to FIG. 7.

Before discussing the message scheduling process in detail, an overview of the bus loading management implemented by the message scheduling process is presented. To guarantee a maximum latency time for each message, the microprocessor 60 on each ECU 42–58 manages the loading on data bus 40 by being allowed to transmit only a fixed number of messages (typically one) on the bus during each 10 msec window. The 10 msec window corresponds to the control cycle of ECUs 42–58 which may, in other systems, have other values. During this 10 msec window, each control unit reads all of its inputs, generates output commands by executing control algorithms, and applies the output commands to the output devices, as well as manages the transmission and reception of messages on bus 40. At, for example, a 250 kBaud bus speed for data bus 40, each bit requires 0.004 msec to transmit. Each message includes a maximum of 150 bits, yielding a maximum of 150 bits/message*0.004 msec/bit=0.600 msec/message. With a maximum of nine control units on data bus 40, as shown in FIG. 2, the maximum bus loading is thus (9 messages*0.600 msec/message)/(10 msec control cycle)*100%=54%. Thus, the maximum bus loading is defined, and the transmission of a message by each ECU is guaranteed to have a maximum latency time of less than 10 msec (e.g., 54% of 10 msec=5.4 msec maximum) since there is guaranteed to be an empty message time slot within each 10 msec window. With a maximum time of 0.600 msec/message, there are time slots for a maximum of 16 messages in each 10 msec window. Since there are only 9 ECUs, and each can transmit only one message during each 10 msec window, there should be at least 7 empty time slots for messages during each window. In reality, the actual bus loading will be less than 54% since it is unlikely that each ECU will transmit a maximum-length message during each 10 msec window. Thus, by allowing each microprocessor 60 to schedule transmission of only one message during each 10 msec window, the message scheduling process guarantees that each ECU can send one message every 10 msec, and the priority scheme of the CAN protocol does not create the problem discussed in the background. Of course, the particular calculations set forth above will change depending on the number of ECUs, the period of the control cycle, etc. The revised calculations would be apparent to those of skill in the art based on the teachings of the example set forth above.

As described above, in the system of FIG. 2, the message scheduling process guarantees a maximum bus loading of 54%. Thus, 46% of the bus bandwidth is available for transmitting additional messages. The ECUs can use all or part of this available bus bandwidth. Where the system designer knows that a particular ECU needs to transmit more than one message during each 10 msec window, that ECU can be allowed to schedule the transmission of more than one message per window. For example, with 16 time slots available in each 10 msec window but only 9 ECUs, there are 7 empty time slots which could be allocated to one or more of the ECUs while still being able to guarantee a maximum bus latency for the ECU for some message of 10 msec. For example, ARU 42 could be allowed to transmit up to 8 messages during each 10 msec control cycle (with the other ECUs limited to one message per cycle), or up to 7 ECUs could each be allowed to transmit 2 messages. Other allocations of the available bus bandwidth for transmitting additional messages may also be selected.

Note that, even with each ECU transmitting a maximum-length message during each 10 msec window, there is still some bus bandwidth available to transmit messages being transmitted on an "expedited" basis (as described below) before their regularly scheduled time slot, and to transmit messages that are only transmitted on a "request-only" basis. Transmission of these messages is accounted for in the 54% bus loading value since these messages will only be transmitted if no other messages were scheduled for transmission during the respective ECU's time slot in the control loop. If this is not true, transmission of these messages will be delayed.

Another benefit of the message scheduling process disclosed herein is to spread out the transmission of messages across data bus 40, which allows effective latency management. The message distribution helps avoid having several messages transmitted at the same time, thereby avoiding arbitration and improving latency.

Figure 5:
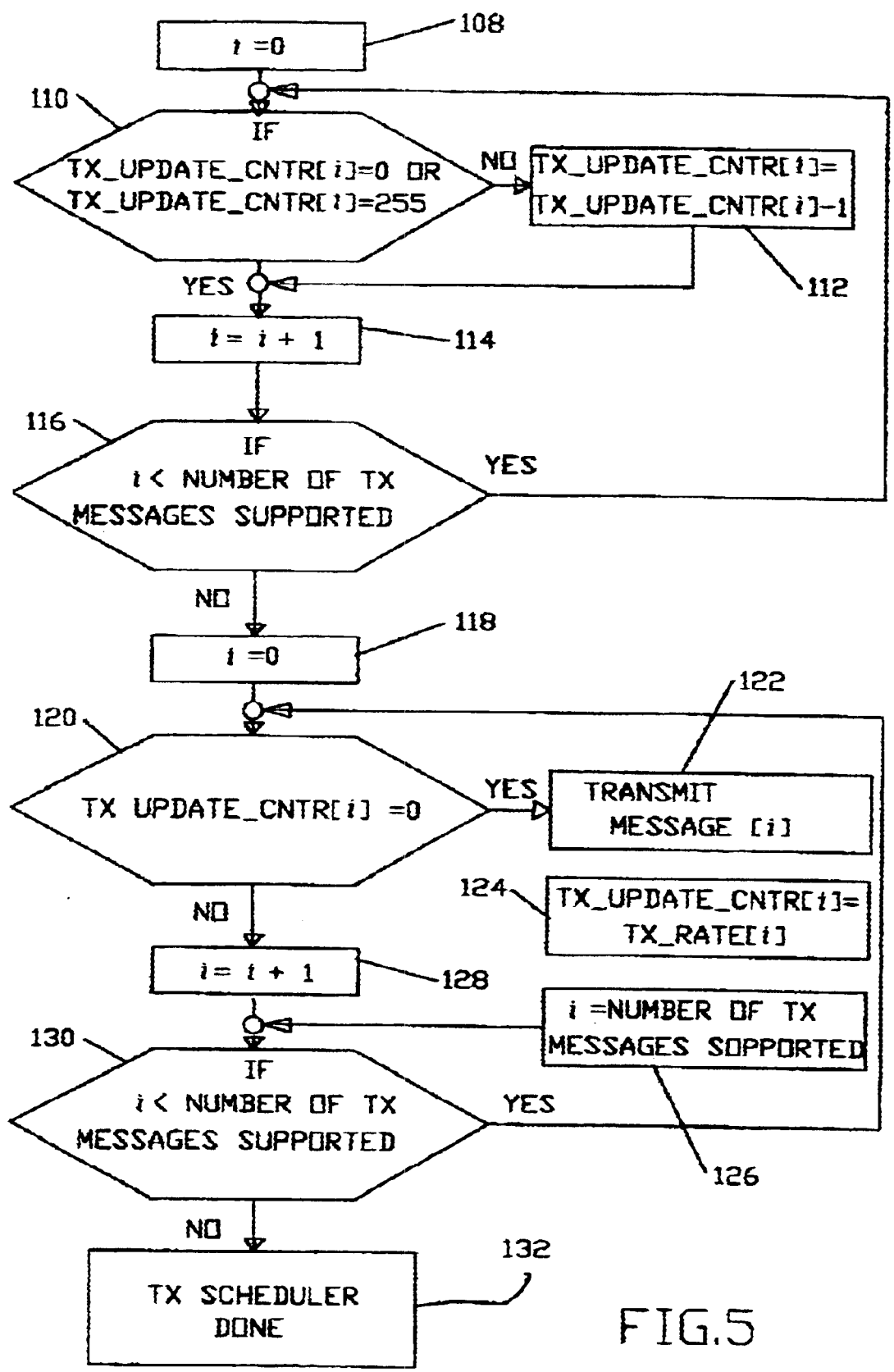
FIG. 5 is a flow diagram illustrating an exemplary message scheduling process executed by each control unit in accordance with the present invention.

Referring now to FIG. 4, most messages transmitted on data bus 40 by each ECU 42–58 are assigned a predefined and periodic transmission update rate which indicates the time intervals at which the message is scheduled to be transmitted. For example, microprocessor 60 may assign a periodic update rate of 50 msec to a first message 98, with the update rate stored in RAM 64 or ROM 66 of the respective ECU. The predefined time period corresponds to a multiple of the control cycle time period of the respective control unit (e.g., the value of "5" corresponds to a 50 msec update rate with the 10 msec control cycle). The message scheduling process shown in FIG. 5 is executed by microprocessor 60 during each control cycle (i.e., every 10 msec). In addition, as discussed above, only one message is transmitted on bus 40 by each ECU during every 10 msec cycle, subject to the exceptions discussed above.

Thus, first message $M_1$ 98 is scheduled to be transmitted once every five control cycles. A second message $M_2$ 100 is also scheduled to be transmitted once every 5 control cycles (i.e., every 50 msec), a third message $M_3$ 102 is scheduled to be transmitted once every 10 control cycles (i.e., every 100 msec), and a fourth message $M_4$ 104 is scheduled to be transmitted once every 50 control cycles (i.e., every 500 msec). Microprocessor 60 schedules the transmission of messages 98, 100, 102 and 104 to meet the respective assigned update rates. Other cycle times can also be used.

As shown in FIG. 4, each message can be assigned a transmission update rate which is the same as or different from that of the other messages, subject to the bandwidth limitations of data bus 40. The order of the data in the transmit list shown in FIG. 4 will affect transmission priority. For example, when more than one message $M_i$ in the array is ready for transmission (i.e., has a timer value of 0), the first message $M_i$ in the list with a timer value of 0 will be the message that is transmitted. The list is normally in ascending order of update rates to help insure that fast update rate messages are not bumped by slower update rate messages during alignment. For example, as shown in FIG. 4, the update rates of 50 msec, 50 msec, 100 msec and 500 msec of messages $M_1$ 98, $M_2$ 100, $M_3$ 102, and $M_4$ 104 are listed in ascending order (i.e., from fastest to slowest update rates). If, for example, the update rates of $M_2$ 100 and $M_4$ 104 were swapped, so that a 500 msec update rate message was listed before a 50 msec update rate message in the transmit list, the transmission of faster update rate message $M_4$ 104 may tend to get bumped due to transmission of slower update rate message $M_2$ 100. Note that an update rate of 0 msec (i.e., 0 counts) may not be used.

For example, if $M_2$ 100 was assigned an update rate of 0 msec, $M_2$ 100 would always be transmitted (if $M_1$ 98 was not scheduled for transmission) and the messages listed later (e.g., $M_3$ 102 and $M_4$ 104) would never be transmitted.

In particular situations, microprocessor 60 can reassign the update rate of a particular message to expedite its transmission on data bus 40. For example, in response to a predetermined condition or event, fourth message $M_4$ 104 (which has a predefined update rate of 500 msec) is made available for immediate transmission before its scheduled transmission time slot based upon its normally scheduled update rate. The predetermined event or condition may include, for example, the transition of an operator input device 75 to an updated setting, or the detection of a fault. Upon the occurrence of the event or condition, the transmission of fourth message $M_4$ 104 (containing updated data) is expedited by having microprocessor 60 set the timer value corresponding to fourth message $M_4$ 104 to zero. The default update rate value (e.g., 500 msec for message $M_4$), stored in RAM 64 or ROM 66, is left unchanged.

The expedited scheduling is particularly advantageous for quickly transmitting the changed status of infrequently changing input devices.

In other situations, microprocessor 60 assigns the update rate of a particular message to a predetermined value (e.g., 255 or FF hex) defined to indicate "request-only" transmission status. For example, a fifth message $M_5$ 106 is assigned the request-only "update rate" of 255. In response to identifying 255 as the update rate of fifth message 106, microprocessor 60 will not transmit fifth message 106 onto bus 40 until a request for fifth message 106 is received by microprocessor 60 from another ECU, or upon the occurrence of an internal event (e.g., detection of a fault) by the local ECU. Fifth message 106 will be transmitted only in response to a specific request for transmission of fifth message 106 from another ECU or due to an internal event being detected, and the value 255 (FF hex) is not used as a timing value. After microprocessor 60 receives such an external or internal request, fifth message 106 is transmitted by reassigning the update rate of fifth message 106 to zero. FIG. 4 also shows the predefined update rates of the $6^{th}$ through nth messages.

For another example of the affect of the order of the list on operation of the system, if a "request-only" message (as described above) is placed at the start of the list, it will delay transmission of other scheduled messages (which are bumped) rather than wait for the next empty time slot for transmission. Thus, only request-only messages with a high urgency would typically be placed at the start of the list. If the request-only message is placed at the end of the list, it will be delayed until an empty time slot becomes available. Thus, such messages would normally be placed at the end of the list where they do not affect the transmission of scheduled messages.

As will be apparent to those skilled in the art, the predefined update rates, the expedited or request-only transmission status, the order of the messages, and the messages themselves will vary depending upon the particular application.

Each microprocessor 60 also reads, from memory 62 of the ECU, data including the number of packets to be sent over bus 40, a 29-bit identifier for each packet to be sent, and a packing selection index for each packet.

Prior to microprocessor 60 executing the message scheduling program, a timer or counter corresponding to each message is initialized with a corresponding predefined transmission update value (i.e., TX_UPDATE_CNTR[i]=TX_RATE[i]) for each message $M_i$, wherein i is the number of supported messages. Microprocessor 60 reads TX_RATE[i] for each message $M_i$ from ROM 66, assigns the TX_RATE[i] value to TX_UPDATE_CNTR[i], and stores TX_UPDATE_CNTR[i] in RAM 64. During initialization, microprocessor 60 could also set the counter of all request-only messages to 255 (i.e., FF hex) and set the counter for all other messages to 0 such that these other messages will all be transmitted as soon as possible.

After the timer or counter for each of the messages has been initialized, the message scheduling program shown in FIG. 5 is executed during every control cycle (e.g., every 10 msec) by microprocessor 60. In step 108, the index value i is initialized to 0. In steps 110–112, if the timer corresponding to $M_i$ is not equal to 0 ("transmit now/expedite message") or 255 ("request only/do not decrement timer"), the timer TX_UPDATE_CNTR[i] is decremented by one (corresponding to one 10 msec control cycle). On the other hand, if the timer corresponding to $M_i$ is equal to 0 ("transmit now/expedite message") or 255 ("request only/do not decrement timer"), the timer TX_UPDATE_CNTR[i] is unchanged so as to not change its transmit urgency. In either case, the index value i is incremented by one in step 114 to index the next supported message. In step 116, the process returns to step 110 if all of the timers corresponding to each of the messages have not been processed (i<number of transmit messages supported). If all of the timers corresponding to each of the messages has been tested in step 110, the process exits the timer decrement loop defined by steps 110–116, re-initializes the index value i at step 118, and enters the message transmission loop defined by steps 120–130.

In steps 120, 128 and 130, microprocessor 60 sequentially checks the array of timer values corresponding to each message $M_i$ until a message having a timer value equal to 0 (i.e., TX_UPDATE_CNTR[i]=0) is found. If none of the messages during the current control cycle has a corresponding timer value equal to 0, microprocessor 60 exits the message scheduling program at step 132 and waits for the next control cycle to restart the process at step 108. If one or more messages have a corresponding timer value equal to 0, however, the first message $M_i$ in the array with a timer value of 0 is transmitted over bus 40 in step 122.

Alternatively, the message scheduling program could have a mechanism to allow higher priority messages to be transmitted before lower priority messages. In one embodiment, each message would be assigned a priority. Then, microprocessor 60 would test all of the timer values to determine all of the messages ready to be transmitted (i.e., to determine all the messages with a timer value of 0) prior to any transmission, and then compare the priority values for all the messages having a timer value of 0. Then, instead of transmitting the first message $M_i$ with a corresponding timer value of 0, the $M_i$ having the highest priority value would be transmitted. This priority scheme, however, could result in the update rate of a message being momentarily delayed by one or more control cycles due to the transmission of a higher priority message(s). In another embodiment for accommodating high priority messages, the highest priority message is placed first in the indexed message list (e.g., TX_UPDATE_CNTR[0] corresponding to a message $M_0$) so that it is the first message tested in step 120, and other high priority messages are similarly placed at the top of the message list.

After message $M_i$ is transmitted in step 122, the timer corresponding to the recently transmitted message $M_i$ is reset by microprocessor 60 in step 124 to its original update rate, which is stored in memory 62 (i.e., RAM 64 or ROM 66). Thus, the timer for each message is not reset to its original update rate until after it has been transmitted on data bus 40. This processing tends to align messages in time slots and create a software loop which increases the probability that there will not be a priority contingency the next time the message is due to be transmitted (especially in the case of high priority messages with the same update rate). Then, in step 126, the index value i is set equal to the number of supported messages to insure that the message scheduling program exits the transmission loop in step 130.

Along with coordinating the transmission of normal messages (i.e., messages transmitted at predefined update rates), the transmit messaging program of FIG. 5 can also handle the transmission of both expedited and request-only messages. Assume a message $M_1$ has been assigned a predetermined periodic update rate. Also assume the communication system is defined such that the transmission of $M_1$ will be expedited on the occurrence of a particular event or condition. In this case, the value of the timer corresponding to message $M_1$ will normally be decremented at step 112 during each control cycle until TX_UPDATE_CNTR[i] for message $M_1$ reaches 0, at which point $M_1$ will be transmitted at step 122, and the timer value will be reset to the periodic update rate at step 126 to prepare for the next transmission of $M_1$. However, when the occurrence of the particular event or condition is detected by microprocessor 60, the corresponding timer is simply set to 0, and message $M_1$ will be transmitted on the next control cycle (assuming that a time slot is open). Thus, the transmission of message $M_1$ will have been expedited due to the occurrence of the event or condition.

For example, assume message $M_1$ includes the status of a slow-changing operator input device such as a switch. Normally, $M_1$ may be assigned a relatively slow update rate (e.g., 500 msec). However, the system may be defined so that, upon the detection of a change in status of the switch, microprocessor 60 will set the timer for $M_1$ to 0, and the changed status of the switch will be transmitted on an expedited basis.

Now, assume that a message $M_2$ has been defined as a request-only message. In this case, the timer value associated with $M_2$ will be initialized with the value of 255 (FF hex). Normally, message $M_2$ will not be transmitted at any update rate since the timer for message $M_2$ (i.e., the TX_UPDATE_CNTR value for $M_2$) will not be decremented by microprocessor 60 at step 112 due to the test at step 110 (i.e., the value 255 represents "do not decrement timer"). However, upon request for the transmission of message $M_2$, microprocessor 60 will simply set the timer for $M_2$ to 0, and message $M_2$ will be transmitted on the next control cycle (assuming that a time slot is open). Thus, the transmission of message $M_2$ will have occurred on a request-only basis. The request may have been presented to microprocessor 60 from another control unit on bus 40 using an appropriate message. Alternatively, microprocessor 60 may be programmed to transmit a request-only message only upon the detection of a particular event or condition (similar to the expedited transmission mode, except that the request-only message is not normally transmitted at any rate). The timer for $M_2$ will then be reset to 255 at step 126 to await the next transmission request.

Figure 6:
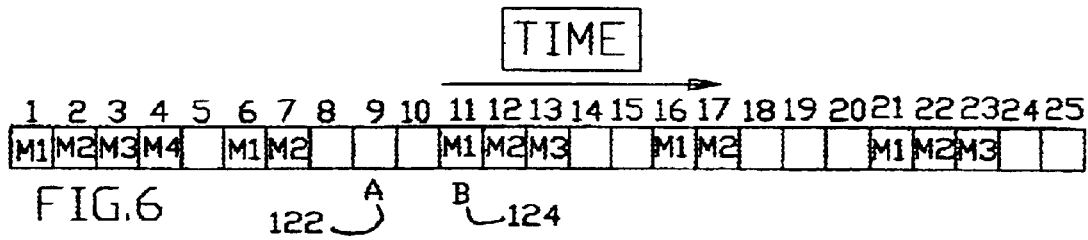
FIG. 6 is a diagrammatical view illustrating an exemplary allocation of messages into time slots based on the scheduling process shown in FIG. 5.

To illustrate the alignment of the messages in a software loop, FIG. 6 depicts a message $M_1$ transmitted every $5^{th}$ control cycle, a message $M_2$ also being transmitted every $5^{th}$ control cycle, a message $M_3$ being transmitted every $10^{th}$ control cycle and a message $M_4$ being transmitted every $50^{th}$ control cycle (in time slot 4), as in FIG. 4. If another message $M_5$ is a request-only message, it can be transmitted on data bus 40 using any open time slots (e.g., time slots 5, 8–10, 14–15, 18–20, 24–25). Depending on during what control cycle $M_5$ was requested by another control unit on bus 40, the communication system may not be able to transmit $M_5$ for one or more control cycles until an open time slot becomes available. For example, if $M_5$ is requested at a time A 122, it will be transmitted on data bus 40 immediately in time slot 9 because time slot 9 is open. However, if $M_5$ is requested at a time B 124, $M_5$ will be delayed three control cycles until time slot 14 since this is the first open time slot following time B. Waiting until time slot 14 to transmit $M_5$ ensures that no more than one message will be transmitted during each control cycle and that the scheduled update transmission rates for messages $M_1$, $M_2$, $M_3$ and $M_4$ are not disrupted.

Alternatively, as explained in reference to FIG. 5 in step 122, a request-only message with high priority can be transmitted immediately upon request by another control unit by storing the request-only message at the beginning of the array indexed by i such that the request-only message will be transmitted even if the particular time slot is not open. This will, however, result in delaying any previously-scheduled message by one control cycle. An expedited message is transmitted as long as there is an open slot (or lower priority message slot) prior to the normal transmit time of the selected message. For example, if an event or condition occurs at time A 122 such that the transmission of message $M_2$ is expedited, the timer corresponding to $M_2$ is set to 0 and the message will be transmitted on data bus 40 in time slot 9 according to the message scheduling program illustrated in FIG. 5. Thereafter, $M_2$ will be realigned to be normally transmitted again in time slots 14, 19, 24, etc.

Figure 7:
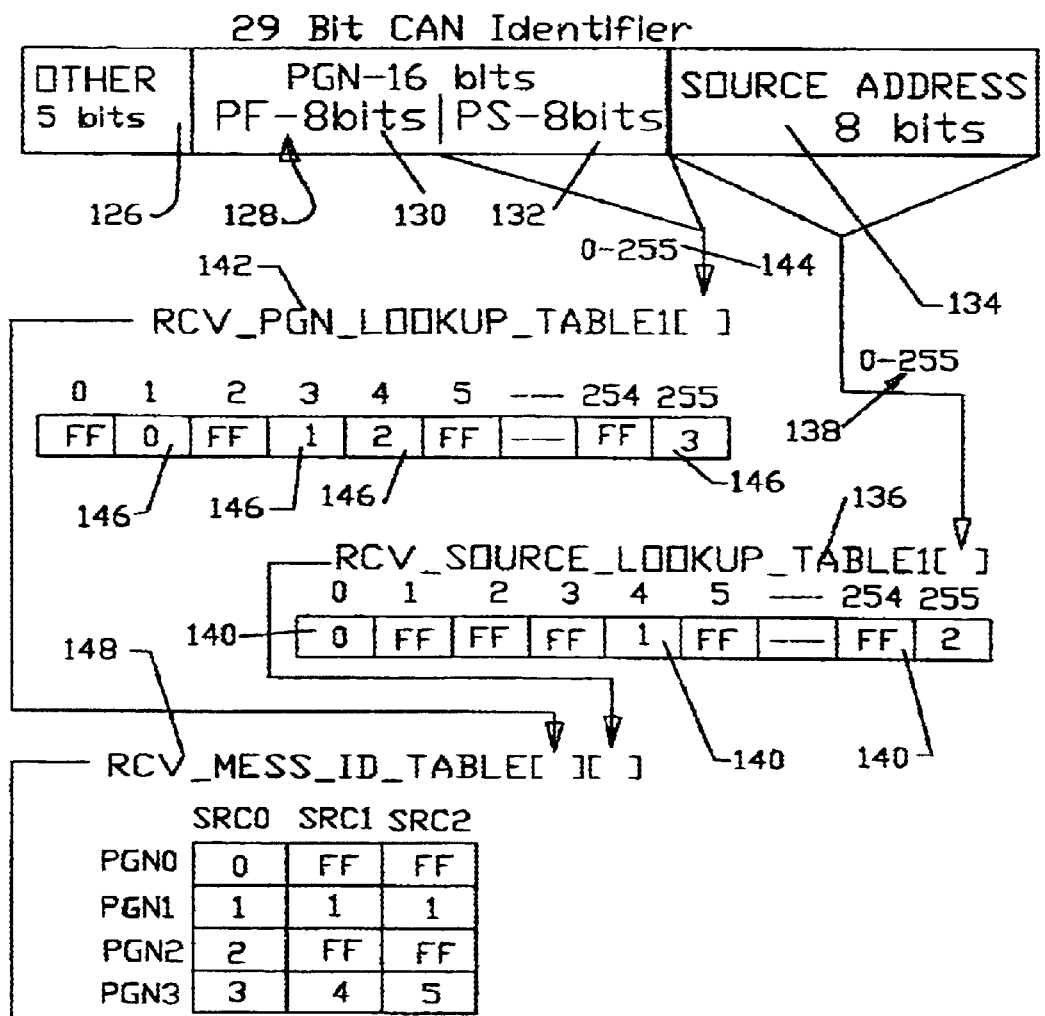
FIG. 7 is a flow diagram illustrating an exemplary message receiving process executed by each control unit for sorting and saving certain desired messages to either a shared memory location or a unique memory location.

In addition to scheduling the transmission of messages on data bus 40, microprocessor 60 of each control unit sorts all incoming messages transmitted on data bus 40 into a set of predefined desired messages and saves each of the desired messages to either a shared or a unique memory location. As illustrated in FIG. 7, in a preferred embodiment, each message contains a 29-bit CAN identifier (based on J-1939 PDU Format 2) including a 5-bit set of arbitration priority bits 126, a 16-bit Parameter Group Number ("PGN") field 128 comprised of a PF 8-bit field 130 and a PS 8-bit field 132 wherein PGN=PF*256+PS, and an 8-bit Source Address field 134 to identify the transmission source (i.e., transmitting control unit) for each message. Microprocessor 60 initially creates and stores a source lookup table 136, a PGN message lookup table 142, and a message storage lookup table 148, in ROM 66.

Source lookup table 136 includes the source value 255 (FF hex) stored at array index locations which equal undesired source addresses, wherein the source identifier values 138 are used as the array index values (e.g., 0–255) for table 136. Source identifier values 138 corresponding to desired source addresses are mapped to unique source values 140 to distinguish the desired source addresses from each other. For example, the set of desired source addresses includes source identifier values {0, 4, 255} whose address locations indexed by these source identifier values contain the set of unique source values {0, 1, 2}, respectively. All other source identifier values in table 136 are mapped to the source value 255 corresponding to the undesired source addresses.

PGN message lookup table 142 includes the message value 255 (FF hex) stored at array index locations equaling undesired PS message values, wherein message identifier values 144 are used as the array index values (e.g., 0–255) for table 142. Message identifier values 144 corresponding to desired PS message values are mapped to unique message values 146 to distinguish the desired PS message values from each other. For example, the set of desired PS message values includes message identifier values {1, 3, 4, 255} whose address locations indexed by these message identifier values contain the set of unique message values {0, 1, 2, 3}, respectively. All other message identifier values in table 142 are mapped to the message value 255 which corresponds to the undesired PS message values.

Received messages are sorted and stored based upon the values stored in message storage lookup table 148 at address locations indexed by the source value from table 136 and the message value from table 142. The storage value 255 (FF hex) is stored at array index locations which equal undesired memory locations. The size of message storage lookup table 148 is determined by the maximum number of desired PS message values and the maximum number of desired source addresses. Based on the tables illustrated in FIG. 7, there are 3 desired source addresses indexed by the set of source identifier values {0, 4, 255} and there are 4 desired PS message values indexed by the set of messenger identifier values {1, 3, 4, 255}. Therefore, the final message storage lookup table 148 must be a 3×4 two-dimensional table.

The lookup tables provide flexibility in sorting and storing incoming messages. For example, if the message value is 0 (PGN0) and the source value is 0 (SRC0), the incoming message will be stored in RAM at a message location indexed by the storage value of 0. However, if the message value is 0 (PGN0) and the source value is 1 or 2, the incoming message will be ignored. In all table lookups, if the output value is FF hex, then the next step is not performed. This next step can be a store to RAM, or a lookup in another table further down the flow. Alternatively, in another embodiment, the incoming message could be stored at a memory location indexed by FF hex, wherein the incoming message would be overwritten by subsequent undesired messages having source values equal to FF hex. Message storage lookup table 148 can also be used by microprocessor 60 to store incoming desired messages from different sources (i.e., control units) in either a shared memory location or unique memory location. For example, if the message value is 1 (PGN1), the incoming message is stored in the memory location indexed by the storage value 1 regardless of whether the source value is 0, 1 or 2, thus saving storage memory space.

Further, depending on the value of the PF field 130 in the 29-bit CAN identifier, a different PGN lookup table 142 is used for PS field 132. This additional processing handles the approximately six combinations of PF field 130 which are defined by the SAE J-1939 standards, which may not be needed in all applications.

On the other hand, instead of storing the incoming desired message in the shared memory location indexed by the storage value of 1, the incoming desired message can be stored in unique memory locations based on the source value. For example, if the message value is 3 (PGN3), the same incoming message will be stored in one of three separate memory locations indexed by the storage value 3, 4 or 5 based upon whether the message is transmitted by a control unit having a source value of 0, 1 or 2, respectively. Therefore, based upon the message and source values associated with incoming messages, desired messages are sorted and stored in memory locations determined by the storage values contained in message storage lookup table 148.

While the embodiments illustrated in the figures and described above are presently preferred, it should be understood that these embodiments are offered by way of example only and may be adapted to various other structures. For example, ECUs 42–58 may differ in structure by using, for example, dedicated, hardwired logic circuits. Additionally, the storage values may be calculated based on the message value and the source value instead of stored in message storage lookup table 148. The invention is not limited to a particular embodiment, but extends to various modifications that nevertheless fall within the scope of the appended claims.

What is claimed is:

1. A communications system for a work vehicle, comprising:

a data bus supported by the work vehicle for communicating messages;

a plurality of control units coupled to the data bus, each control unit configured to control a function of the work vehicle, each control unit including a processor configured to control communications with at least one other control unit on the data bus, the communications including transmission of first messages onto the data bus and reception of second messages from the data bus;

wherein the processor of each control unit is further configured to schedule the transmission of only a predefined number of the first messages on the data bus during a predefined time period, the predefined number selected so that each control unit can transmit its scheduled messages within the predefined time period;

each of the first messages transmitted by each control unit being assigned a transmission update rate, and the processor of each control unit being also configured to schedule the transmission of the first messages to meet the respective assigned update rates; and the processor of each control unit further being configured to perform a request to transmit a scheduled operation wherein, in response to the a request made by the processor, a requested message corresponding to the request is made available for immediate transmission.

2. The communications system of claim 1, wherein the assigned update rate of one of the first messages can differ from the assigned update rate of another of the first messages.

3. The communications system of claim 1, wherein the processor of each control unit is further configured to perform an expedited transmission scheduling operation wherein, in response to a predetermined condition, one of the first messages is made available for transmission before the time the one of the first messages would otherwise be transmitted based upon its assigned transmission update rate.

4. The communications system of claim 3, wherein the predetermined condition includes actuation of an operator input device to an updated setting, and the first message made available for expedited transmission includes data representative of the updated setting, whereby the transmission of the updated data is expedited.

5. The communications system of claim 1, wherein the request to transmit a scheduled operation is a request-only to transmit a scheduled operation, and the requested message is transmitted only in response to the request made by the processor.

6. The communications system of claim 1, wherein the data bus includes a controller area network (CAN) data bus.

7. The communications system of claim 1, wherein the predefined number of first messages which can be transmitted on the data bus by each control unit during the predefined time period is one.

8. The communications system of claim 1, wherein the predefined time period corresponds to a control cycle time period of the respective control unit.

9. A communications system for a work vehicle, comprising:

a data bus supported by the work vehicle for communicating messages;

a plurality of control units coupled to the data bus, each control unit configured to control a function of the work vehicle, each control unit including a processor configured to control communications with at least one other control unit on the data bus, the communications including transmission of first messages onto the data bus and reception of second messages from the data bus;

wherein the processor of each control unit is further configured to schedule the transmission of only a predefined number of the first messages on the data bus during a predefined time period, the predefined number selected so that each control unit can transmit its scheduled messages within the predefined time period;

each of the first messages transmitted by each control unit being assigned a transmission update rate, and the processor of each control unit is also configured to schedule the transmission of the first messages to meet the respective assigned update rates;

the processor of each control unit being further configured to perform an expedited transmission scheduling operation wherein, in response to a predetermined condition, one of the first messages is made available for transmission before the time the one of the first messages would otherwise be transmitted based upon its assigned transmission update rate; and wherein the processor of each control unit is also configured to perform a request to transmit a scheduled operation wherein, in response to the a request made by the processor, a requested message corresponding to the request is made available for immediate transmission.

10. A communications system for a work vehicle, comprising:

a data bus supported by the work vehicle for communicating messages; and a plurality of control units coupled to the data bus, each control unit configured to control a function of the work vehicle, each control unit including a processor for controlling communications with a at least one other control unit on the data bus, the communications including transmission of first messages onto the data bus and reception of second messages from the data bus, the second messages including both undesired messages and a set of desired messages;

wherein the processor of each control unit is further configured to sort the second messages in reference to a plurality of lookup tables to distinguish between the undesired messages and the set of desired messages, and to save each of the desired messages in a memory location defined to store the respective message.

11. The communications system of claim 10, wherein one of the control units can receive a particular one of the desired messages from more than one of the other control units, each of the other control units having a different source address.

12. The communications system of claim 11, wherein the control unit is configured to save the particular one of the desired messages to either a shared memory location independent of the source address of the transmitting control unit, or a unique memory location based on the source address of the transmitting control unit.

13. The communications system of claim 10, wherein each of the second messages includes an identifier including a message identifier and a source identifier, the message identifier identifying the contents of the respective second message and the source identifier identifying the source of the respective second message.

14. The communications system of claim 13, wherein a first of the lookup tables is a message lookup table, the message lookup table configured to correlate the message identifier of each second message with a corresponding message value.

15. The communications system of claim 14, wherein a second of the lookup tables is a source lookup table, the source lookup table configured to correlate the source identifier of each second message with a corresponding source value.

16. The communications system of claim 14, wherein the message lookup table comprises a plurality of message lookup tables, and one of the plurality of message lookup tables is selected based upon a portion of the message identifier of each second message.

17. The communications system of claim 15, wherein a third of the lookup tables is a message storage lookup table, the message storage lookup table configured to correlate the message value from the first lookup table and the source value from the second lookup table with a corresponding storage value, the storage value being an index to a memory location defined to store the respective second message.

18. The communications system of claim 17, wherein the data bus includes a controller area network (CAN) bus conforming to SAE J1939 standards, the identifier is a SAE J1939 identifier including a Parameter Group Number (PGN) and a Source Address (SA), the message identifier is the PGN, and the source identifier is the SA.

19. The communications system of claim 17, wherein one of the control units can receive a particular one of the desired messages from more than one of the other control units, each of the other control units having a different source address, and the one control unit is further configured to save the particular one of the desired messages to either a shared memory location independent of the source address of the transmitting control unit, or a unique memory location based on the source address of the transmitting control unit, based upon the storage values in the third lookup table.

20. The communications system of claim 17, wherein each of the second messages, associated by the third lookup table with a predetermined undesired storage value, is not stored.

21. The communications system of claim 17, wherein each of the second messages associated by the third lookup table with a predetermined undesired storage value is stored in a shared undesired memory location.

22. The communications system of claim 21, wherein the processor transmits messages in either a normal, expedited or request mode of operation.

23. The communications system of claim 21, wherein one of the control units can receive a particular desired message from more than one of the other control units, each of the other control units having a different source address, and the control unit is further configured to save the particular desired message to either a shared memory location independent of the source address of the transmitting control unit, or a unique memory location based on the source address of the transmitting control unit.

24. A communications system for a work vehicle, comprising:

a data bus supported by the work vehicle for communicating messages; and a plurality of control units coupled to the data bus, each control unit configured to control a function of the work vehicle, each control unit including a processor configured to control communications with at least one other control unit on the data bus, the communications including transmission of first messages onto the data bus and reception of second messages from the data bus, the second messages including both undesired messages and a set of desired messages;

wherein the processor of each control unit is further configured to schedule the transmission of only a predefined number of the first messages on the data bus during a predefined time period, the predefined number selected so that each control unit can transmit its scheduled messages within the predefined time period; and wherein the processor of each control unit is further configured to sort the second messages in reference to a plurality of lookup tables to distinguish between the undesired messages and the set of desired messages, and to save each of the desired messages in a memory location defined to store the respective message.

* * * * *